United States Patent
Demsky et al.

(10) Patent No.: US 6,928,242 B1
(45) Date of Patent: Aug. 9, 2005

(54) BUILT IN SELF TEST METHOD AND CIRCUIT FOR PARALLEL OPTICAL TRANSMITTERS

(75) Inventors: Kevin Paul Demsky, Rochester, MN (US); Ladd William Freitag, Rochester, MN (US); Matthew James Paschal, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 737 days.

(21) Appl. No.: 09/689,758

(22) Filed: Oct. 13, 2000

(51) Int. Cl.[7] ............................................. H04B 10/08
(52) U.S. Cl. .................. 398/23; 398/182; 398/186; 398/194; 398/195; 398/196; 398/197; 398/9; 398/10; 398/16; 398/17; 398/22; 398/27; 375/221; 375/219; 375/224; 365/201; 714/733; 714/738; 714/739
(58) Field of Search .................. 398/9, 10, 16, 398/17, 23, 141, 182, 195, 189, 190, 191, 398/726, 724, 712, 186, 194, 196, 197, 22, 398/27; 714/733, 718, 719, 738, 739; 375/224, 375/219, 221; 365/201

(56) References Cited

U.S. PATENT DOCUMENTS

| | | | |
|---|---|---|---|
| 6,201,829 B1 * | 3/2001 | Schneider | ................... 375/221 |
| 6,480,308 B1 * | 11/2002 | Yoshida et al. | ............... 398/16 |
| 6,549,310 B1 * | 4/2003 | Kuchta et al. | ...................... 1/1 |
| 6,564,349 B1 * | 5/2003 | Mitten et al. | ............... 714/733 |
| 6,567,198 B1 * | 5/2003 | Kang | .......................... 398/91 |

* cited by examiner

*Primary Examiner*—Hanh Phan
(74) *Attorney, Agent, or Firm*—Rabin & Berdo, PC

(57) ABSTRACT

An on-chip parallel data generator, including a Built In Self Test (BIST) generator, is integrated into a laser driver array of a parallel optical communication transmitter so that all optical outputs switch simultaneously. The BIST generator requires only one clock input which clocks the BIST generator for all channels. The optical outputs respond to either the on-chip BIST generator or the electrical inputs if a valid signal is present on the inputs.

11 Claims, 5 Drawing Sheets

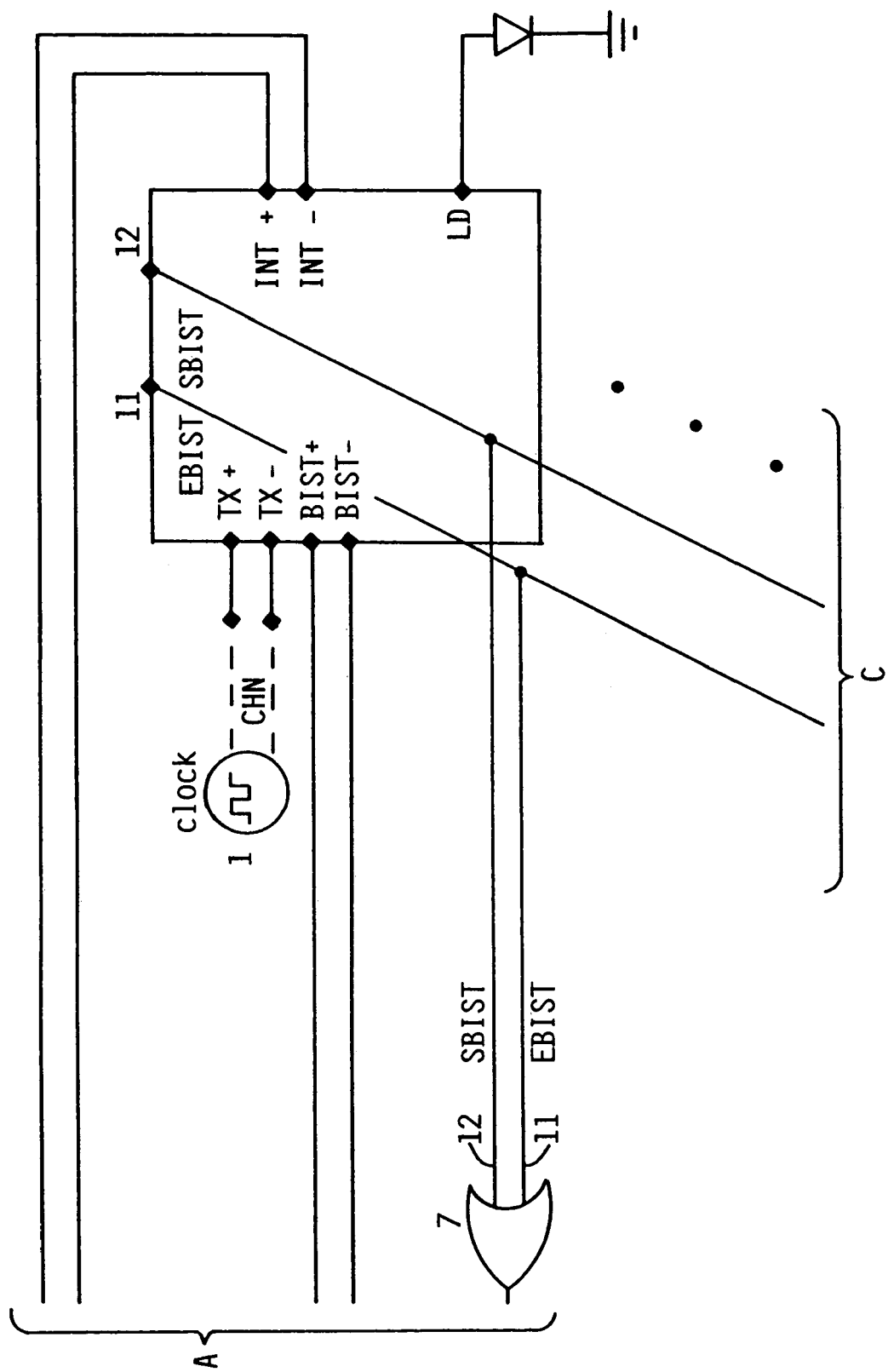
FIG. IB

BUILT IN SELF TEST METHOD AND CIRCUIT FOR PARALLEL OPTICAL TRANSMITTERS

BACKGROUND OF THE INVENTION

1. Field of the Invention

The present invention relates to the field of testing parallel optical communication transmitters.

2. Background Information

To test Bit Error Ratio (BER) on all channels of a parallel optical communication transmitter, all channels must be exercised. Such testing requires equipment that includes a single data generator and data detector, and they must be switched to each input and output of a laser driver chip until all channels are tested, or in the alternative the test equipment must include multiple data generator/detectors.

In an attempt to solve the problems described above, an on-chip parallel data generator, including a Built In Self Test (BIST) parallel data generator, is integrated into the transmitter so that all optical outputs may be switched synchronously. The BIST generator requires only one clock input which clocks the BIST generator for all channels. However, a problem still exists because when asynchronous BER testing is desired, the electrical inputs cannot be used for any other testing since the parallel inputs of the chip are ignored during BIST operation.

SUMMARY OF THE INVENTION

It is, therefore, a principle object of the this invention to provide a built-in self test method and circuit for parallel laser transmitters.

It is another object of the invention to provide a built-in self test method and circuit for parallel laser transmitters that solves the above-mentioned problems.

These and other objects of the present invention are accomplished by the built-in self test method and circuit for parallel laser transmitters that are disclosed herein.

Asynchronous crosstalk measurements are performed when a single channel input is provided by a single data generator and channels adjacent thereto are switching asynchronous to the single data generator. Crosstalk and noise problems may be measured qualitatively and quantitatively by using a BIST generator that generates a pseudo-random bit sequence on many channels as an on-chip noise source. Furthermore, while in BIST mode, any combination of channels may switch at a rate determined by a BIST input clock, or held quiet at a static 0 or 1 for a DC coupled product. This is advantageous while analyzing parameters that are sensitive to noise or crosstalk. Therefore, it is desired that the optical output of a channel responds to the electrical input of that channel, while other channels are running in BIST mode.

As a result, the complexity of testing is significantly reduced in comparison with conventional testing methods, as described in the example above, because only one data generator and one clock source are used. In the alternative, to reduce complexity of testing, fewer, or even no, switches that are capable of switching data at the full data rate, for example coaxial switches, are used. The reduction, or absence, of switches thus reduces complexity of testing. It also gives greater test coverage with only one data generator allowing the user to choose which optical outputs will output BIST data or external asynchronous data.

To that end, the present invention includes a BIST generator that is incorporated into a parallel optical transmitter. The parallel optical transmitter includes N laser driver channels in addition to the aforementioned BIST generator.

An external clock source is applied to the differential inputs of Channel N of the parallel optical transmitter. The external clock inputs are buffered by Channel N and applied to the clock input of the BIST generator. Control signal inputs EBIST and SBIST are used to put the transmitter array in BIST mode.

The external data inputs are applied to the inputs of a data receiver and a signal detector. The signal detector determines if a signal with a valid common mode voltage level is present on the Tx inputs. The data receiver buffers the Tx inputs, and the outputs of the data receiver are connected to a multiplexer input. The BIST generator outputs are applied to a buffer before being connected to the B inputs of the multiplexer. A logic block controls which of two multiplexer inputs is passed by the multiplexer to the inputs of a laser driver. The laser driver then converts the differential input to a single ended current to drive the laser. Thus, the signal detector is connected in parallel with the data receiver and the output of the signal detector is passed to the multiplexer.

The combinations of EBIST, SBIST and SIGDET determines if the input data or BIST data gets passed to the laser driver. In particular, in the "hard BIST" (EBIST) mode, BIST signals are transmitted along all of Channels 0–N. On the other hand, in the "soft BIST" (SBIST) mode, if the signal detector determines the presence of a valid signal, the logic block makes the determination, based on a predetermined logic table, as to whether BIST data or real data is passed through the multiplexer to the inputs of the laser driver of that channel.

As an example, the signal detector is a pull-down detector. In operation, as the signal detector receives external data inputs, if a first node falls below a second node, the signal detection output goes low, indicating that a valid signal is not present, although any polarity may be produced by inverting the comparator inputs. If the external inputs are held low, a comparator of the signal detector indicates that a valid signal is not present.

DETAILED DESCRIPTION OF A PREFERRED EMBODIMENT

Figure 1A:
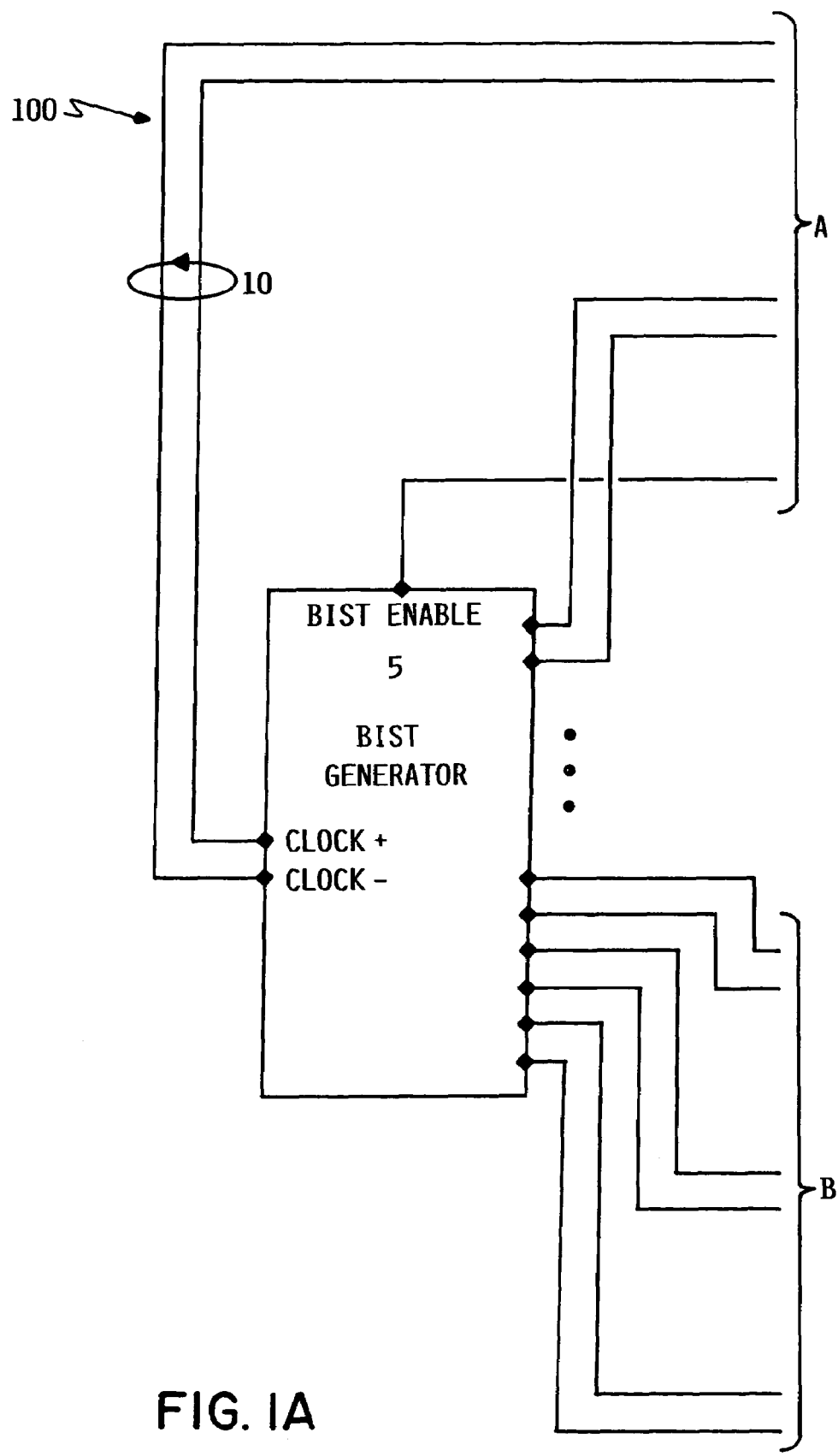
FIG. 1 shows an example embodiment of a parallel optical communication transmitter, including a BIST generator, according to the present invention.

Before beginning a detailed description of the invention, it should be noted that, when appropriate, like reference numerals and characters may be used to designate identical, corresponding or similar components in differing figure drawings. Further, in the detailed description to follow, example embodiments and values may be given, although the present invention is not limited thereto.

Figure 1C:
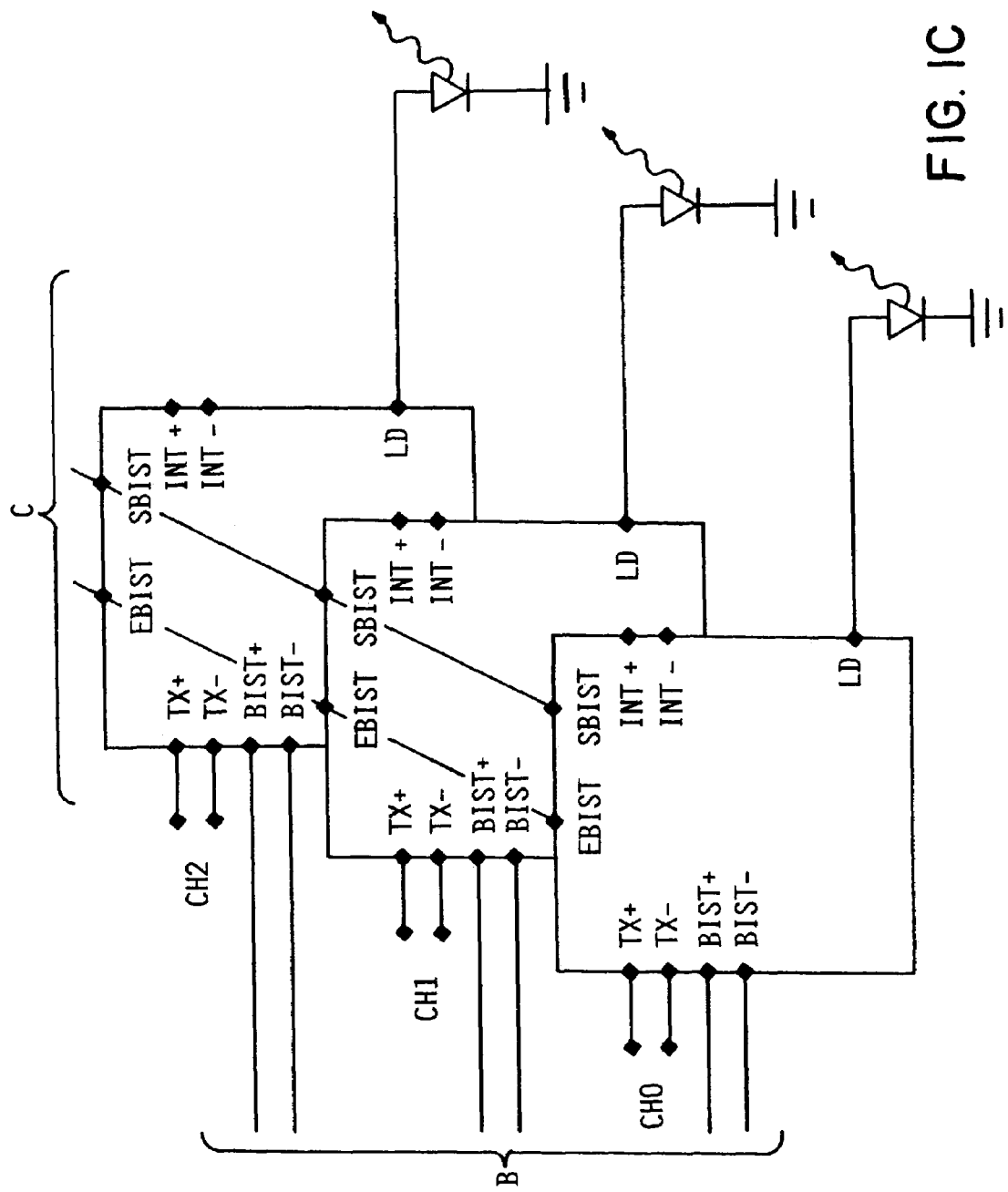

FIG. 1 shows a BIST generator 5 that is incorporated into the parallel optical transmitter 100, in accordance with an example embodiment of the present invention. Parallel optical transmitter 100 includes N laser driver channels Channels 0–N (CH0–CHN) in addition to the aforementioned BIST generator 5.

An external clock source 1 may be applied to the inputs of Channel N CHN, during BIST mode operation. Otherwise, the Channel N inputs are data. EBIST 11 and SBIST 12 are control signal inputs used to select the type of data that is passed to the laser driver, choosing from BIST data and external data. OR gate 7 enables the BIST generator 5. Thus, when EBIST and SBIST are 0, BIST generator 5 is disabled, as will be described further below regarding Logic Block 70 in FIG. 2. BIST Generator 5 may receive clock signals from Channel N (CHN), as shown in FIG. 1, or the clock source for BIST generator 5 may be an oscillator with an arbitrarily chosen frequency.

Figure 2:
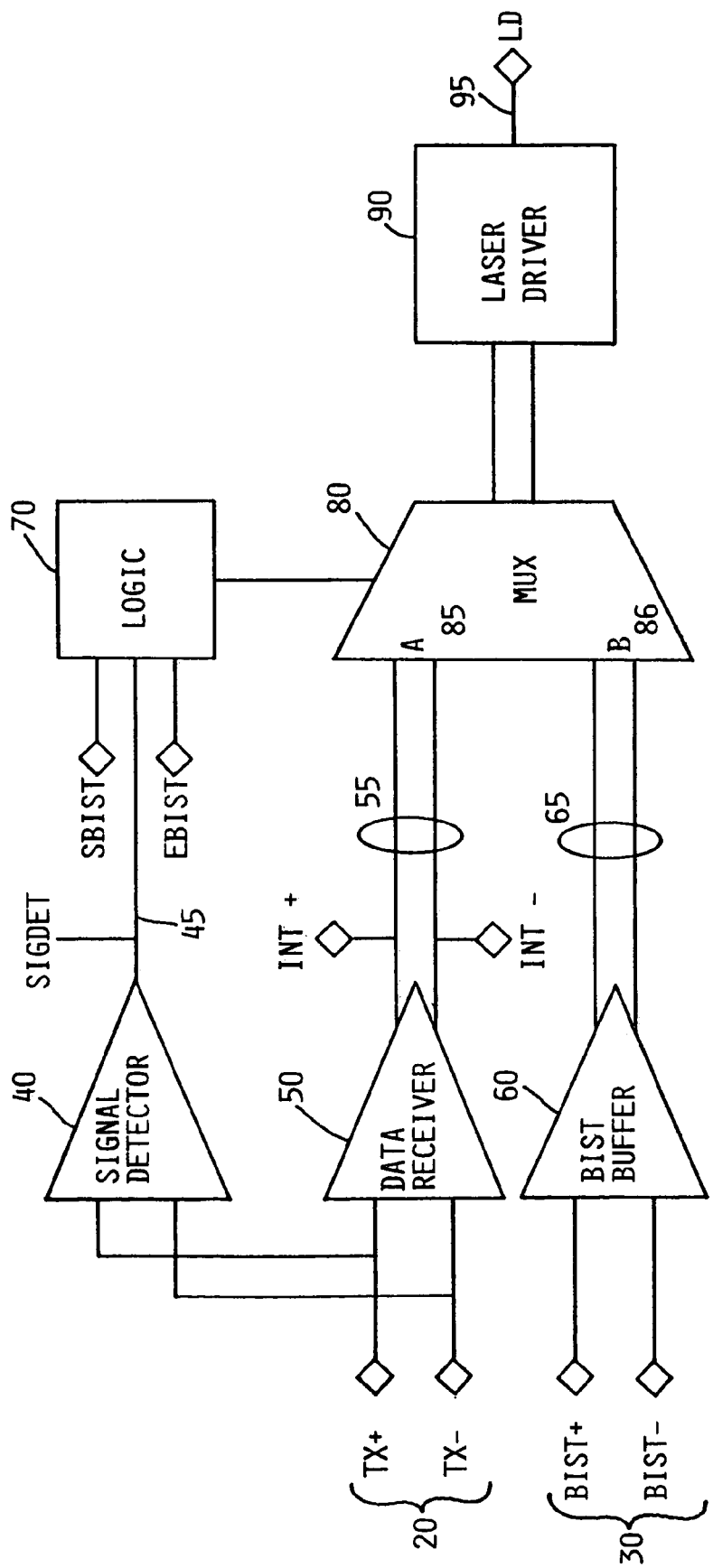
FIG. 2 shows an example of a channel in the example embodiment of a parallel optical communication transmitter shown in FIG. 1, according to an example embodiment of the present invention.

FIG. 2 shows the contents of each channel in FIG. 1. The external data inputs 20 are differential signals that are applied to the inputs of Data Receiver 50 and Signal Detector 40. Signal Detector 40 determines if a signal with a valid common mode (average voltage) is present on the Tx inputs 20. The Data Receiver 50 buffers the Tx inputs 20, and the outputs 55 of Data Receiver are connected to multiplexer input A 85. The BIST generator 5 of FIG. 1 generates BIST inputs 30, and the inputs 30 are buffered by the BIST Buffer 60. BIST Buffer outputs 65 are connected to the multiplexer input B 86. Logic block 70 controls which of inputs "A" 85 or "B" 86 is passed by multiplexer 80 to the inputs of Laser Driver 90. Laser Driver 90 then converts the differential input to a single ended current 95 to drive the laser. FIG. 2 shows, as an example, how Signal Detector 40 is connected in parallel with the Data Receiver 50 and how the output 45 of Signal Detector 40 is passed to the Multiplexer 80.

The combinations of EBIST, SBIST and SIGDET determines if the input data or BIST data gets passed to the laser driver. In particular, in the "hard BIST" (EBIST) mode, BIST signals are transmitted along all of Channels 0–N. On the other hand, in the "soft BIST" (SBIST) mode, if Signal Detector 40 determines the presence of a valid signal on the Tx inputs, Logic Block 70 allows Multiplexer 80 to pass the external data to the laser driver 90.

Figure 3:
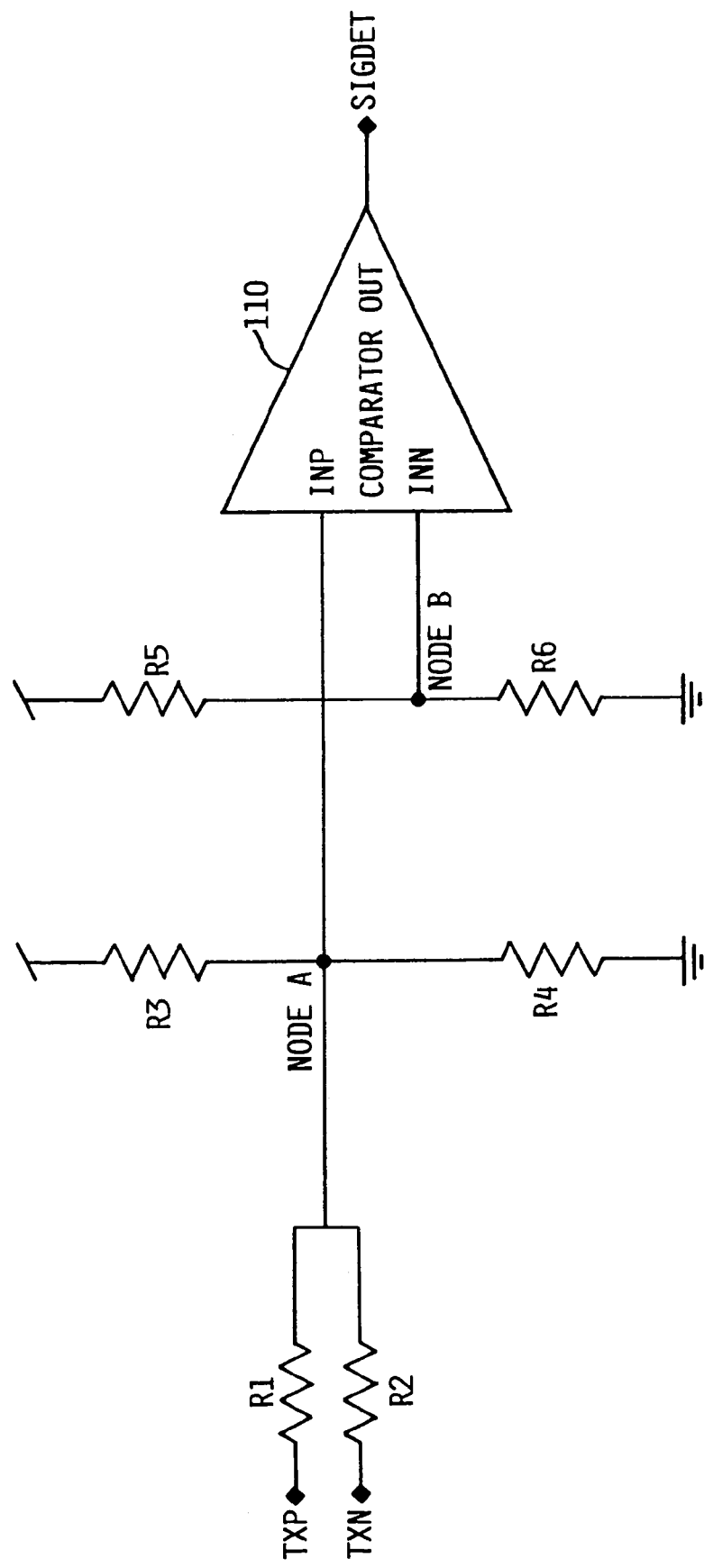
FIG. 3 shows an example of common mode pull-down detector, as utilized in the example of FIG. 1, according to an example embodiment of the present invention.

FIG. 3 shows Signal Detector 40 of FIG. 2 in greater detail. As an example, Signal Detector 40 is a pull-down detector. In operation, as Signal Detector 40 receives external data inputs 20, if node A falls below node B, the output SIGDET goes low, indicating that a valid signal is not present, although any polarity may be produced by inverting the comparator inputs. If the average of the input voltages at node A falls below the voltage at node B, the comparator 110 indicates that a valid signal is not present.

For example, if the receiver common mode is X volts, and the single ended amplitude of both inputs is Y volts, then the lowest voltage the incoming signal can reach is X−0.5Y volts. The other signal is at X+0.5Y volts. The midpoint of R1 and R2 is the average or common mode=X volts. If this common mode voltage ever falls below a common mode voltage threshold set by R5 and R6, the comparator 110 flips indicating that a signal with a valid common mode is not present. The preceding example only works with DC coupled inputs and with signals having a common mode that is high enough above ground to accommodate setting the common mode voltage threshold between ground and the lowest valid common mode including margins for common mode noise, comparator offset, ground bounce and tolerance in the threshold itself. If signals are too close to ground, the topology can easily be switched to a common mode pull up detector. In this case one would tie the differential inputs high (to VDD), to pass data to the output from the BIST generator 5 in FIG. 1.

The following truth table gives only an example of how the logic block 70 of FIG. 2 may be implemented, though many other truth tables may be implemented.

TRUTH TABLE

| SBIST | SIGDET | EBIST | LD |
|---|---|---|---|
| 0 | 0 | 0 | DISABLE |
| 0 | 0 | 1 | BIST |
| 0 | 1 | 0 | TX |
| 0 | 1 | 1 | BIST |
| 1 | 0 | 0 | BIST |
| 1 | 0 | 1 | BIST |
| 1 | 1 | 0 | TX |
| 1 | 1 | 1 | BIST |

EBIST and SBIST are selected globally. SIGDET 45 in FIG. 2 is the signal produced by the Signal Detector 40. SIGDET 45 is logic high if a signal with valid common mode is applied to the Tx inputs 20 in FIG. 2. SIGDET 45 is low when a signal with non-valid common mode is applied to Tx inputs 20 such as connecting them to ground in the case where PECL logic is used. EBIST forces the laser driver output 95 to be the BIST signal independent of the logic states of SBIST and SIGDET.

This concludes the description of the example embodiments. Although the present invention has been described with reference to illustrative embodiments thereof, it should be understood that numerous other modifications and embodiments can be devised by those skilled in the art that will fall within the scope and spirit of the principals of the invention. More particularly, reasonable variations and modifications are possible in the component parts and/or arrangements of the subject combination arrangement within the scope of the foregoing disclosure, the drawings and the appended claims without department from the spirit of the invention. In addition to variations and modifications in the component parts and/or arrangements, alternative uses will also be apparent to those skilled in the art.

We claim:

1. A method for testing each parallel optical communication channel in an optical communication transmitter with a plurality of parallel channels, said method comprising:

transmitting, simultaneously on different channels, at least one of external data signals and test signals to a multiplexer in each channel of said optical communication transmitter;

detecting whether said external data signals include differential data signals having a valid common mode voltage level; and selecting either of said external data signals or said test signals for transmitting from said multiplexer to a laser driver based at least in part on whether differential data signals having a valid common mode voltage level are detected.

2. A method according to claim 1, wherein said test signals are generated and transmitted by a built-in self test (BIST) generator.

3. A method for testing each parallel optical communication channel in an N-channel parallel optical communication transmitter, said method comprising:

transmitting, simultaneously on different channels, at least one of external data signals and test signals to a multiplexer in each channel of said N-channel parallel optical communication transmitter;

detecting whether said external data signals include data signals having a valid common mode voltage level; and selecting either of said external data signals or said test signals for transmitting from said multiplexer to a laser driver, wherein a data receiver that is provided in parallel with a signal detector buffers said external data signals, wherein a BIST buffer buffers said test signals, and wherein said signal detector performs said detecting of whether said external data signals include signals having a valid common mode voltage level.

4. A method according to claim 3, wherein a logic gate receives an output signal from said signal detector and performs said selecting of either of said external data signals or said test signals for transmitting from said multiplexer to said laser driver based on the received signal, a soft BIST signal and a hard BIST signal.

5. A method according to claim 3, wherein said signal detector is a pull-down detector.

6. A method according to claim 4, wherein said selecting, performed by said logic gates, of either of said external data signals or said test signals for transmitting from said multiplexer to said laser driver includes selecting either of the received signal or BIST data if the received signal is a valid signal and the soft-BIST signal is present, and further includes selecting BIST data if the hard-BIST signal is present or the received signal is not a valid signal and the soft-BIST signal is present.

7. A parallel optical communication transmitter testing system, comprising:

a test signal buffer that buffers test signals that are received from a test signal generator;

a data receiver that buffers external data signals that are received from a communication transmitter;

a signal detector that buffers said external data signals from said communication transmitter, wherein said signal detector receiving said external data signals is in parallel with said data receiver, and wherein said signal detector detects whether said external data signals include signals having a valid common mode; and a multiplexer that receives said external data signals from said data receiver and said test signals from said test signal buffer and that transmits either of said external data signals and said test signals to a laser driver.

8. A system according to claim 7, wherein said test signal generator is a built-in self test (BIST) generator.

9. A system according to claim 7, further comprising logic gates that receive an output signal from said signal detector and select either of said external data signals or said test signals for transmission from said multiplexer to said laser driver using the received signal, a soft-BIST signal and a hard-BIST signal.

10. A system according to claim 9, wherein said logic gates select, for transmission from said multiplexer to said laser driver, either of the received signal or BIST data if the received signal is a valid signal and the soft-BIST signal is present, and further select BIST data if the hard-BIST signal is present or the received signal is not a valid signal and the soft-BIST signal is present.

11. A system according to claim 7, wherein said signal detector is a pull-down detector.

* * * * *